United States Patent
Leroux

(10) Patent No.: US 10,536,211 B2
(45) Date of Patent: Jan. 14, 2020

(54) MOBILE DEVICE RELAY SERVICE FOR RELIABLE INTERNET OF THINGS

(71) Applicant: Philippe Leroux, Ottawa (CA)

(72) Inventor: Philippe Leroux, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 15/294,230

(22) Filed: Oct. 14, 2016

(65) Prior Publication Data

US 2018/0109308 A1    Apr. 19, 2018

(51) Int. Cl.
| | |
|---|---|
| *H04B 7/14* | (2006.01) |
| *H04L 12/46* | (2006.01) |
| *H04L 29/08* | (2006.01) |
| *H04L 12/24* | (2006.01) |
| *H04L 12/703* | (2013.01) |

(Continued)

(52) U.S. Cl.
CPC ............ *H04B 7/14* (2013.01); *H04B 7/2606* (2013.01); *H04L 12/4604* (2013.01); *H04L 67/18* (2013.01); *H04W 8/005* (2013.01); *H04W 76/19* (2018.02); *H04L 41/0654* (2013.01); *H04L 45/28* (2013.01); *H04L 49/557* (2013.01); *H04L 2012/5627* (2013.01); *H04W 8/30* (2013.01); *H04W 84/12* (2013.01); *H04W 88/04* (2013.01); *H04W 88/06* (2013.01)

(58) Field of Classification Search
CPC ..... H04B 7/14; H04B 7/2606; H04L 12/4604; H04L 41/0654; H04L 45/28; H04L 49/557; H04L 67/18; H04L 2012/5627; H04W 8/30; H04W 84/12; H04W 88/06; H04W 76/19; H04W 88/04

See application file for complete search history.

(56) References Cited

U.S. PATENT DOCUMENTS

| | | | |
|---|---|---|---|
| 9,231,904 B2 | 1/2016 | Johnson et al. | |
| 9,749,420 B2 * | 8/2017 | Malik | ............. H04L 67/125 |

(Continued)

FOREIGN PATENT DOCUMENTS

| | | |
|---|---|---|
| CN | 107468201 A | 7/2015 |
| CN | 104967562 A | 10/2015 |

(Continued)

OTHER PUBLICATIONS

International Search Report dated Jan. 15, 2018 for corresponding International Application No. PCT/CN2017/105715 filed Oct. 11, 2017.

(Continued)

*Primary Examiner* — Asad M Nawaz
*Assistant Examiner* — Kai Chang

(57) ABSTRACT

Methods and systems are provided for managing an Internet of Things object having a single active Radio Access Technology for communication with a data network via a hub of a local network. The method comprises: receiving, by a service provider server connected to the data network, information indicating a loss of connectivity between the Internet of Things object and the data network via the hub; and establishing, by the service provider server, a relay connection between the Internet of Things object and the data network, connectivity between the Internet of Things object and the data network being restored via the relay connection.

18 Claims, 7 Drawing Sheets

(51) Int. Cl.
*H04L 12/939* (2013.01)
*H04L 12/70* (2013.01)
*H04W 8/30* (2009.01)
*H04W 84/12* (2009.01)
*H04W 88/06* (2009.01)
*H04B 7/26* (2006.01)
*H04W 8/00* (2009.01)
*H04W 76/19* (2018.01)
*H04W 88/04* (2009.01)

(56) References Cited

U.S. PATENT DOCUMENTS

| | | |
|---|---|---|
| 2005/0286503 A1 | 12/2005 | Oda et al. |
| 2012/0015602 A1* | 1/2012 | Murakami ............ H04B 7/155 455/7 |
| 2012/0158991 A1* | 6/2012 | Ajjaguttu ............ H04B 7/155 709/238 |
| 2014/0324973 A1* | 10/2014 | Goel ................ H04W 4/70 709/204 |
| 2015/0124585 A1* | 5/2015 | Sahin ................ H04W 36/12 370/218 |
| 2015/0312230 A1 | 10/2015 | Choi et al. |
| 2016/0164725 A1* | 6/2016 | Wu ................ H04W 76/10 713/168 |
| 2016/0164831 A1* | 6/2016 | Kim ................ H04L 43/08 709/223 |
| 2016/0212599 A1* | 7/2016 | Kudou ................ H04W 40/20 |
| 2016/0261465 A1* | 9/2016 | Gupta ................ H04L 12/2816 |
| 2016/0379165 A1* | 12/2016 | Moakley ............ H04W 4/046 705/333 |
| 2017/0094670 A1 | 3/2017 | Yang et al. |
| 2017/0171778 A1* | 6/2017 | Britt ................ H04W 28/10 |
| 2017/0181217 A1* | 6/2017 | Van Oost ............ H04L 12/189 |
| 2017/0265187 A1* | 9/2017 | Chen ................ H04W 76/14 |
| 2017/0346677 A1* | 11/2017 | Suryanarayana ... H04L 41/0668 |
| 2017/0353981 A1* | 12/2017 | Lee ................ H04W 12/08 |
| 2018/0020329 A1* | 1/2018 | Smith ................ H04W 4/029 |
| 2018/0049256 A1* | 2/2018 | Sang ................ H04W 76/15 |
| 2018/0152894 A1* | 5/2018 | Lin ................ H04L 29/08 |

FOREIGN PATENT DOCUMENTS

| | | |
|---|---|---|
| CN | 105307290 A | 2/2016 |
| EP | 2309808 A2 | 4/2011 |
| WO | 2012088022 A2 | 6/2012 |

OTHER PUBLICATIONS

"Bluetooth SIG Announces Architecture to Connect Billions of Devices to the IoT"; https://www.bluetooth.com/news/pressreleases/2016/02/10/bluetooth-sig-announces-architecture-to-connect-billions-of-devices-to-the-iot.

* cited by examiner

MOBILE DEVICE RELAY SERVICE FOR RELIABLE INTERNET OF THINGS

CROSS-REFERENCE TO RELATED APPLICATIONS

This is the first application filed in respect of the present invention.

TECHNICAL FIELD

The present disclosure relates to radio access networks, and in particular to a System and Method for mobile device relay service for reliable Internet of Things (IoT).

BACKGROUND

The so-called Internet of Things (IoT) has been proposed as an architecture for connecting physical devices using embedded electronics that enable these objects to collect and exchange data. In 2013 the Global Standards Initiative on Internet of Things (IoT-GSI) defined the IoT as "the infrastructure of the information society." The IoT is intended to allow objects to be sensed and/or controlled remotely across existing network infrastructure, creating opportunities for more direct integration of the physical world into computer-based systems, and resulting in improved efficiency, accuracy and economic benefit.

A key enabler of the IoT is the availability of low power and low cost communications access technology, which allows the IoT object to connect to a network and thereby send and receive information. Typically, a low-cost radio access technology (RAT) using, for example, the Bluetooth wireless technology standard, is used as the communications access technology, but other technologies may be used. For example, IoT objects with relatively high data demands may use a RAT based on the WiFi wireless technology standard. Other access technologies may be developed in the future, and may also be adopted for use in IoT objects.

An important factor in the IoT is high reliability. In particular, it is anticipated that many IoT objects, such as, for example, door locks and other security devices will require very reliable connectivity to the internet in order to function properly. Typically, high reliability in wireless communications is accomplished by providing a device with multiple RATs that may be used as needed to establish a connection to a data network. For example, a typical smart-phone may be able to connect to the network using any of WiFi, 3G, 4G, Long Term Evolution (LTE) or other wireless communications technologies, and so may select the best available technology for maintaining connectivity at any given time. A disadvantage with this approach is that the provision of a device capable of using multiple RATs is significantly more expensive than a device that is limited to a single RAT for uplink connections to a data network.

Accordingly, there is a technical problem to be solved which may be described as how to improve the reliability of IoT objects that are provisioned with a single uplink RAT.

SUMMARY

An advantage of the present invention is that it enhances reliability of IoT objects by providing an alternate connection path to the network for an IoT object during a failure of that IoT object's normal network connection.

Accordingly, an aspect of the present invention provides a method for managing an Internet of Things object having a single active Radio Access Technology for communication with a data network via a hub of a local network. The method comprises: receiving, by a service provider server connected to the data network, information indicating a loss of connectivity between the Internet of Things object and the data network via the hub; and establishing, by the service provider server, a relay connection between the Internet of Things object and the data network, connectivity between the Internet of Things object and the data network being restored via the relay connection.

A further aspect of the present invention disclosure provides a Service Provider server connected to a data network, the Service Provider server being configured to: receive information indicating a loss of connectivity between the Internet of Things object and the data network via the hub; and establish a relay connection between the Internet of Things object and the data network, connectivity between the Internet of Things object and the data network being restored via the relay connection.

A further aspect of the present invention disclosure provides a non-transitory computer readable medium storing software instructions configured to control a Service Provider server connected to a data network, the software instructions implementing a method comprising: receiving information indicating a loss of connectivity between the Internet of Things object and the data network via the hub; and establishing a relay connection between the Internet of Things object and the data network, connectivity between the Internet of Things object and the data network being restored via the relay connection.

A further aspect of the present invention disclosure provides a method for managing an Internet of Things object having a single active Radio Access Technology for communication with a data network via a hub of a local network. The method comprises: receiving, by a user equipment connected to the data network, information indicating a loss of connectivity between the Internet of Things object and the data network via the hub; and establishing, by the user equipment, a relay connection between the Internet of Things object and the data network, connectivity between the Internet of Things object and the data network being restored via the relay connection.

In some embodiments, the information may further comprise: receiving, by the user equipment, a beacon signal or distress signal from the Internet of Things object; and sending, by the user equipment, a response message to the Internet of Things object.

In some embodiments, the beacon signal or distress signal from the Internet of Things object may have a predetermined format.

In some embodiments, the beacon signal or distress signal from the Internet of Things object may comprise information identifying an Internet of Things server connected to the data network. In such cases, establishing the relay connection may comprise: sending, by the user equipment, an offer message to the Internet of Things server; and receiving, by the user equipment, configuration information from the Internet of Things server.

In some embodiments, the beacon signal or distress signal from the Internet of Things object may comprise information identifying an Internet of Things server connected to the data network. In such cases, establishing the relay connection may comprise: sending, by the user equipment, an offer message to a Service Provider server; and receiving, by the user equipment, configuration information from the Service Provider server.

If desired, the method may further comprise: sending, by the Service Provider server, an offer message to the Internet of Things server; and receiving, by the Service Provider server, configuration information from the Internet of Things server.

In some embodiments, establishing the relay connection may further comprise: negotiating, by the user equipment, a connection between the user equipment and the Internet of Things object, based on the received configuration information; setting up, by the user equipment, a connection between the user equipment and the data network, based on the received configuration information; and bridging, by the user equipment, the connection between the user equipment and the Internet of Things object and the connection between the user equipment and the data network, based on the received configuration information.

In some embodiments, receiving the information may comprise: broadcasting, by the user equipment, a beacon signal; and receiving, by the user equipment, a response to the beacon signal from the Internet of Things object.

In some embodiments, the response signal from the Internet of Things object has a predetermined format.

In some embodiments, the response signal from the Internet of Things object may comprise information identifying an Internet of Things server connected to the data network. In such cases, establishing the relay connection may comprise: sending, by the user equipment, an offer message to the Internet of Things server; and receiving, by the user equipment, configuration information from the Internet of Things server.

In some embodiments, the response signal from the Internet of Things object may comprise information identifying an Internet of Things server connected to the data network. In such cases, establishing the relay connection may comprise: sending, by the user equipment, an offer message to a Service Provider server; and receiving, by the user equipment, configuration information from the Service Provider server.

In some embodiments, the method may further comprise: sending, by the Service Provider server, an offer message to the Internet of Things server; and receiving, by the Network Operator server, the configuration information from the Internet of Things server.

In some embodiments, receiving the information may comprise: receiving, by the user equipment, a request message from a Service Provider server; broadcasting, by the user equipment, a beacon signal in response to the request message; and receiving, by the user equipment, a response to the beacon signal from the Internet of Things object.

In some embodiments, receiving the information may comprise: receiving, by the user equipment, a request message from a Service Provider server; monitoring, by the user equipment in response to the request message, to detect a beacon signal or distress signal from the Internet of Things object; and when the beacon signal or distress signal is detected, sending, by the user equipment, a response message to the Internet of Things object.

A further aspect of the present invention provides a non-transitory computer readable storage medium comprising software instructions for controlling a user equipment connected to a data network, the software instructions configured to control the user equipment to perform steps of: receiving information indicating a loss of connectivity between an Internet of Things object and the data network, the Internet of Things object having a single active Radio Access Technology for communication with the data network; and establishing a relay connection between the Internet of Things object and the data network, such that connectivity between the Internet of Things object and the data network is restored via the relay connection.

BRIEF DESCRIPTION OF THE DRAWINGS

Features and advantages of the present invention will become apparent from the following detailed description, taken in combination with the appended drawings, in which.

It will be noted that throughout the drawings, like elements are identified by like reference numerals.

DETAILED DESCRIPTION

In the following description, the invention is described by way of example embodiments in which connectivity to and from an Internet of Things (IoT) object having a single radio access technology (RAT) can re-established following a loss of connection. However, it will be recognised that the present invention is not limited to such embodiments. Rather, techniques in accordance with the present invention can be employed to provide a recovery mechanism enabling a transceiver with a single active uplink RAT to re-establish connectivity to a data network following a failure. Such a single-uplink RAT transceiver may be associated with any device or object, which may or may not be associated with an Internet of Things (IoT) service. For the purposes of the present disclosure, the terms "transceiver with a single active uplink RAT" and "single-uplink RAT transceiver" are used synonymously to refer to a transceiver having only one Radio Access Technology that is available for use by the transceiver for connecting to a data network or a device (such as an access point) connected to a data network. Such a transceiver may in fact be provisioned with more than one Radio Access Technology. For example, a transceiver may be configured with a Bluetooth RAT for connecting to downlink devices within a local network, and a WiFi RAT for connection to a data network providing end-to-end connectivity and/or network-based services. In this case, and for the purposes of this disclosure, the Bluetooth type RAT may be referred to as a downlink RAT because it is configured to connect to devices that are topologically downstream from the transceiver, and the WiFi RAT may be referred to as an uplink RAT because it is configured to connect to devices and networks that are topologically upstream of the transceiver. In the present disclosure it is assumed that only one Radio Access Technology is enabled for the uplink connection to the data network, and any other Radio Access Technologies are either disabled or are only configured for downlink connections to devices within a local network.

Figure 1:
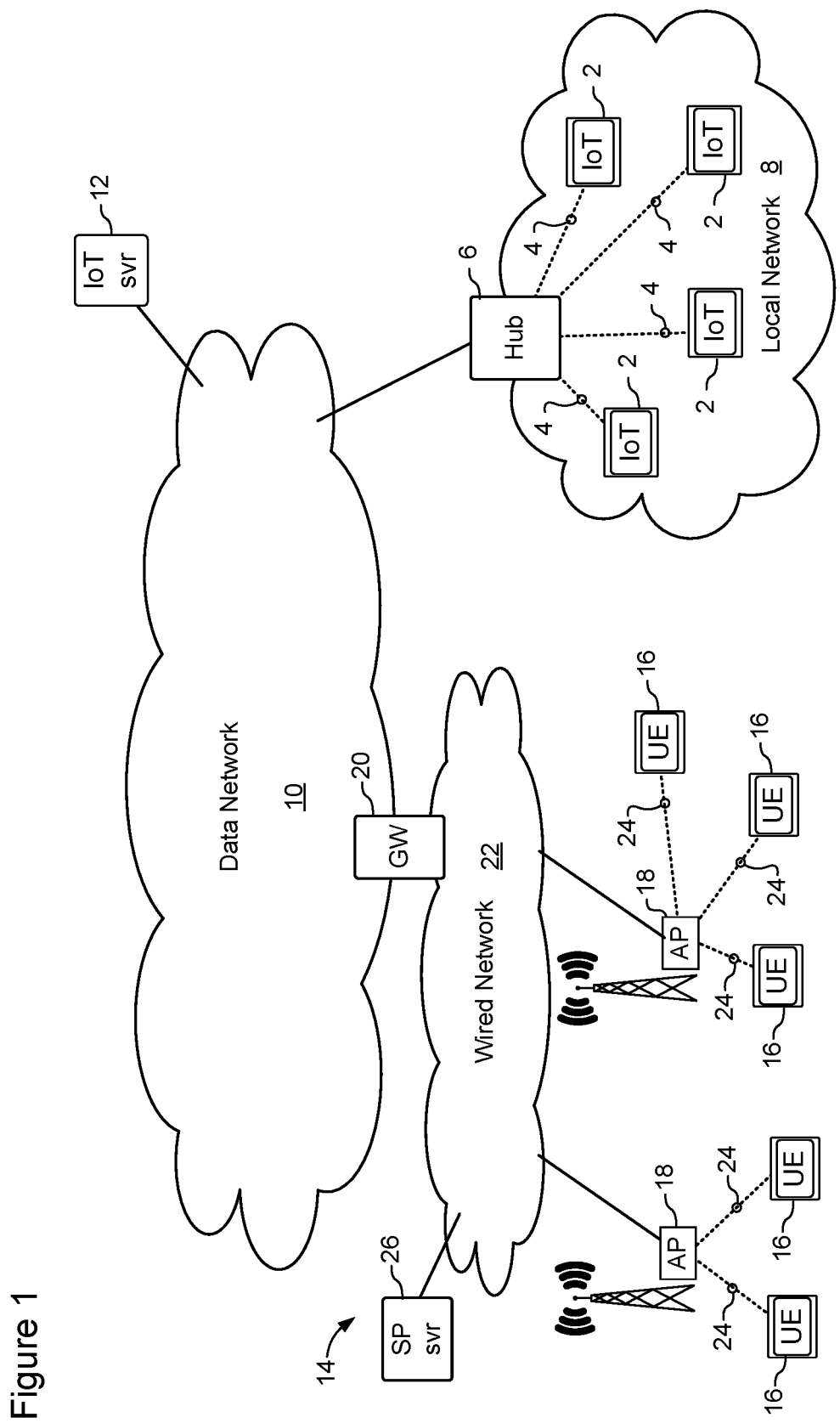
FIG. 1 is a block diagram schematically illustrating principal elements of a network in which techniques in accordance with the present disclosure may be implemented.

FIG. 1 schematically illustrates an example network architecture in which techniques in accordance with the present disclosure may be used. In the architecture of FIG. 1, one or more IoT objects 2 are connected via wireless links 4 to a hub 6 of a local network 8. hub 6 is connected to a data network 10 such as the Internet. In the illustrated example, an IoT Server 12 connected to the data network 10 communicates with the IoT objects 2 via the hub 6. The IoT server 12 may be an IoT server configured to deliver one or more IoT services within the coverage area of the local network 8. Alternatively, the IoT server 12 may be a management server that operates to monitor and control connectivity between the data network 10 and the IoT objects 2.

The IoT objects 2 within the local network 8 may take any desired form. For the purposes of this disclosure, an IoT object 2 shall be understood to refer to any object or device having a single uplink RAT transceiver. The specific RAT enabled in the transceiver for the uplink connection to the data network may be selected as desired, and will normally reflect the nature of the local network 8.

It is contemplated that the local network 8 will be designed based on the context in which the IoT objects 2 are expected to operate. For example, where the context is a relatively small interior space (such as, for example, a private residence or a small office), the local network 8 may take the form of a private wireless network, and the uplink RAT enabled in the IoT object 2 transceivers may be a low-power near-field radio communications standard such as Bluetooth. Alternatively, where the context is a relatively large indoor space or a combined indoor and outdoor space (such as, for example, a shopping center or a university campus), the uplink RAT enabled in the transceivers may be a more powerful radio communications standard such as Wi-Fi. It will be appreciated that such an IoT object may also have a downlink RAT (such as Bluetooth) for connecting to other IoT devices within the local network 8. For example, an IoT object within the local network 8 may be configured to operate as a wireless relay to thereby extend the reach of the hub 6.

The hub 6 may be configured as any suitable combination of hardware and software for mediating packet flows between the IoT objects 2 and the data network 10 and/or the IoT server 12. For example, in a case where the local network 8 takes the form of a private wireless network, the hub 6 may be provided as a Bluetooth-enabled wireless modem which may include one or more Bluetooth-enabled radio transceivers and antennas configured to support wireless communications with Bluetooth-enabled IoT objects 2 within the coverage area of the hub 6, and a wired network interface configured to maintain a wired connection to the data network 10. If desired, the hub 6 may also provide firewall or other security features. The hub 6 may also be configured to support alternative or additional RATs, if desired.

The architecture of FIG. 1 also includes a conventional radio access network (RAN) 14 which is configured to provide connectivity between User Equipment (UE) 16 such as mobile phones, mobile computers, Personal Data Assistants (PDAs) or the like and the data network 10 which provides end-to-end communications services. For the purposes of the present disclosure, UEs 16 are assumed to be capable of sending and receiving data packets. At least some of the UEs 16 are configured with multiple RATs (such as, for example, WiFi, LTE, 3G, 4G, 5G and Bluetooth), and are referred to herein as multi-RAT UEs. In the example of FIG. 1, the RAN 14 comprises radio Access Points (AP) 18 that are connected to a Gateway (GW) 20 through a wired network 22. Each AP 18 includes radio transceiver equipment for maintaining wireless connections 24 with the UEs 16, and signal routing equipment for forwarding signals through the wired network 22 to the GW 20. The GW 20 provides a link between the RAN 14 and the data network 10, and so enables traffic flows between the data network 10 and UEs 16. A Service Provider (SP) server 26 may be deployed by the mobile network operator to deliver predefined services to subscribers of the RAN 14. In some embodiments, the SP server 26 may be provided as a Service Capability Exposure Function (SCEF) device, or an equivalent to an SCEF device, but this is not essential.

With the arrangement of FIG. 1, IoT services within the local network are provided through the data network 10 via data communication with the IoT objects 2 within the local network 8. It will be appreciated that a loss of connectivity between an IoT object 2 and the data network 10 will likely impact the provision of IoT services within the local network 8.

For the purposes of this disclosure, it is assumed that a loss of connectivity is the result of a failure at the hub 6, for example due to a failure of either of the radio transceiver or the wired network interface, or a failure of one or more links between the data network 10 and the hub 6. For the purposes of this disclosure, it is assumed that loss of connectivity is not due to a failure of either the IoT object 2 itself or the IoT Server 12.

As may be appreciated, loss of connectivity may be detected by either or both of the IoT server 12 and the disconnected IoT object (that is, the IoT object that has detected that it has lost its connection to the IoT server). In the case of the IoT server 12 a detected loss of connectivity to a given IoT object 2 may trigger one or more processes to restore the disconnected connectivity. Example processes will be described in greater detail below. In the case of the disconnected IoT object 2, a detected loss of connectivity may trigger the disconnected IoT object 2 to transmit a predetermined beacon and/or monitor received radio signals to detect a predetermined signal. Such a beacon may take the form of a connection request, using either its credentials (such as the Service Set Identifier (SSID)) for the hub 6 or a secondary set of credentials that have been prearranged for use in the event of a loss of connectivity. Alternatively, a beacon may be as simple as a "Ping", which is used to alert nearby devices of the presence of the disconnected IoT object. If the IoT object receives a predetermined response to the beacon, it may then send a connection request in an attempt to establish a connection with the source of the response signal. Alternatively the IoT may not send any beacon, and simply monitor the RAT for a given predefined broadcasted signal which when received will enable the IoT object to connect to the source of that signal.

Figure 2:
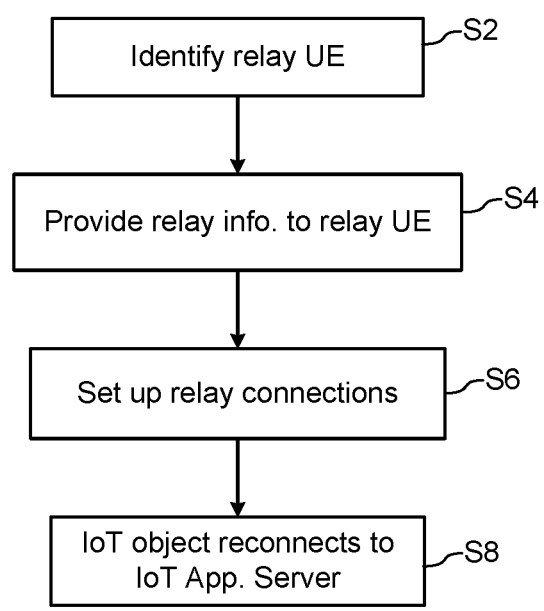
FIG. 2 is a flow chart showing principal steps in a generic process in accordance with the present disclosure.

FIG. 2 is a flowchart showing principle steps in a generic process for restoring connectivity between an IoT object and the IoT Server. Each of the generic steps of FIG. 2 are described in greater detail below by way of the example embodiments shown in FIGS. 3-7.

Referring to FIG. 2, in a first step (at S2), a multi-RAT UE 16 capable of supporting a relay connection between the disconnected IoT object 2 and the packet data network 10 is found. For example, a UE 16 may be found that supports the same RAT as the disconnected IoT object 2, and is physically close enough to the disconnected IoT object 2 to enable a connection to be set up. Once the relay UE 16 is located, information is sent to the relay UE 16 (at S4) to enable it to establish a connection with the disconnected IoT object 2. This information may, for example, include information identifying the RAT to be used for connection with the disconnected IoT object 2 and parameters to use for the RAT such as channels, mode, protocols and connectivity identifiers such as Service set identifier (SSID) for a Wi-Fi type of RAT. Additional information may include certificates, tokens or identifiers that are needed by the relay UE 16 in order to validate and accept a connection request from the IoT object 2. Similar additional information may be sent to the relay UE 16 for retransmission to the IoT object 2 in order for the IoT object 2 to validate and accept to be relayed by this UE 16. At a third step (at S6), the relay UE 16 sets up connections with the disconnected IoT object 2 and the data network 10, bridges the connections to provide connectivity all the way to the data network 10, so that the disconnected IoT object 2 can reach the data network 10. If desired, the connection between the relay UE 16 and the data network 10 may be configured in accordance with policies of the Mobile Network Operator, which may implement an agreement with the IoT service provider, for example. This may enable the Mobile Network Operator to implement desired administrative functions, for example by routing relay packets in a predetermined network slice to facilitate accounting or other special treatments of the data. At a forth step (S8), the disconnected IoT object 2 can connect to the IoT server 12, via the connection path through the relay UE 16, and re-authenticate to restore connectivity.

As may be appreciated, the four steps of the generic process described above may be implemented in a variety of different ways, without departing from the intended scope of this disclosure. The embodiments described below with reference to FIGS. 3-7 provide specific example implementations of the generic technique of FIG. 2.

Figure 3:
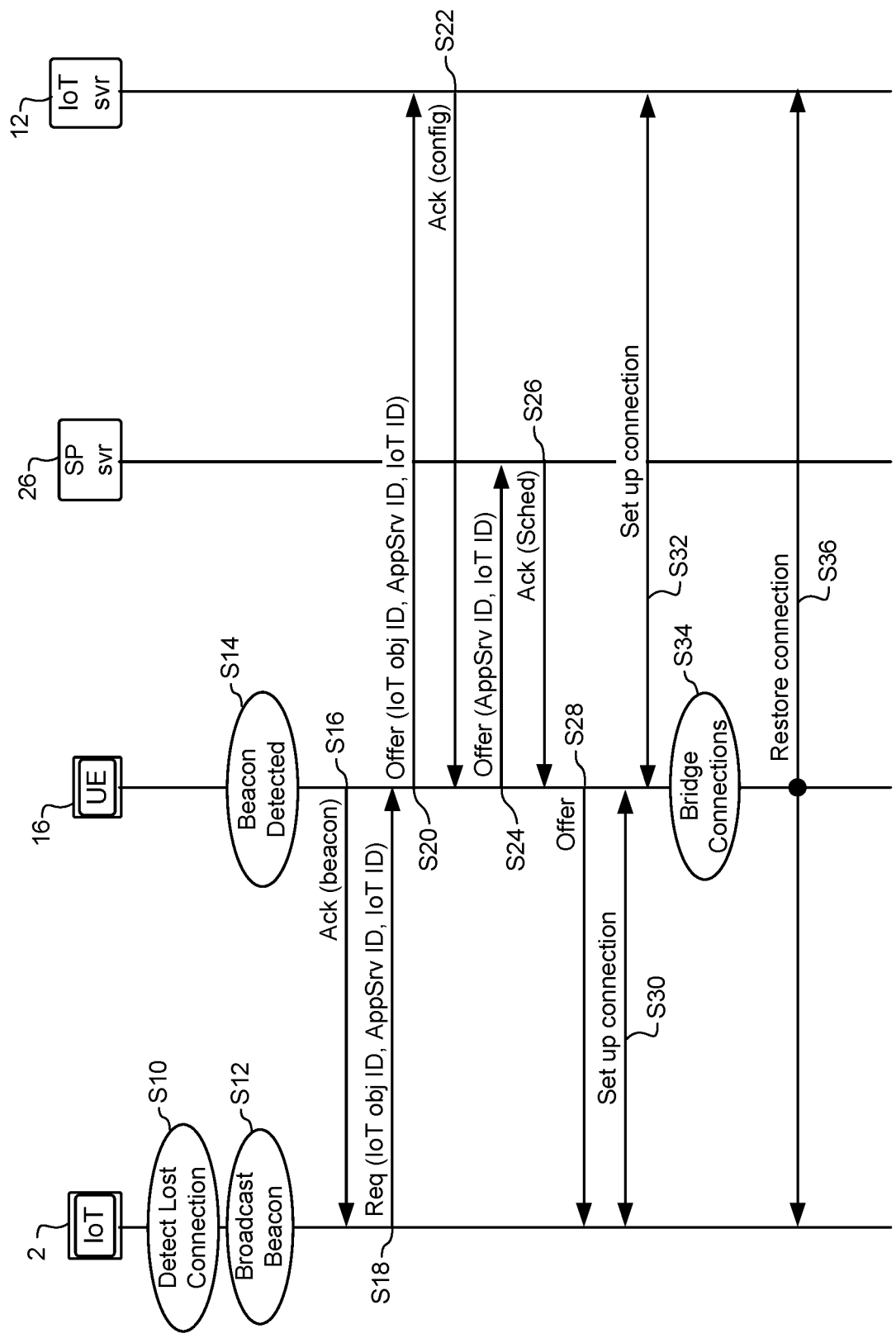
FIG. 3 is a message flow diagram showing principal messages exchanged during a first example process in accordance with the generic process of FIG. 2.

FIG. 3 is a signal flow diagram schematically illustrating a first example implementation of the generic technique of FIG. 2. Referring to FIG. 3, the method begins with loss of the connection between the IoT object 2 and the IoT server 12.

When the IoT object 2 detects the loss of connection (at S10), it broadcasts (at S12) a beacon or distress signal. Various techniques may be used by the IoT object 2 to detect the loss of connection. For example, the IoT object 2 may be configured to receive a predetermined signal from the IoT server 12 at preset intervals. Failure of the IoT object 2 to detect the predetermined signal within a time-out period may thus be used to detect a loss of connection. As noted above, the beacon or distress signal may be formatted as desired, including, for example, a connection request signal or a simple "ping". Alternatively, the beacon or distress signal may have a predetermined format that is recognised by UEs 16 within the RAN 14. Since the IoT object 2 is configured with a single active uplink RAT, the beacon or distress signal will necessarily be broadcast using that RAT.

If a UE 16 detects the beacon or distress signal (at S14), it may send a response message (at S16) to the disconnected IoT object. Preferably, the response message will have a predetermined format that can be readily recognised by the disconnected IoT object. Upon receipt of the response message, the disconnected IoT object 2 may send a relay request message (at S18) to the UE, in order to request a relay connection to the IoT server 12. For example, the relay request message may include an identifier of the IoT object 2, an address of the IoT server 12, and an identifier of the IoT network or service within which the IoT object 2 operates. Based on the information contained in the relay request message, the UE 16 may send (at S20) an offer message to the IoT server 12, in order to offer to relay a connection for the IoT object 2. If the IoT server 12 accepts the offer, it may reply (at S22) with an acknowledgement message including configuration information needed by the relay UE 16 to set up connections for relaying packets. The UE 16 may also send (at S24) an offer message to the SP server 26, indicating that it is able to relay packets for the IoT object 2 and IoT server 12. In response to the offer message, the SP server may respond (at S26) with an acknowledgment message including administrative information such as, for example, scheduling information needed by the UE 16 so that it can send relayed data packets to the IoT server 12 using a network slice selected by the SP server 26.

The UE may then send (at S28) an offer to relay data packets to the disconnected IoT object 2. In response to the offer to relay data packets, the disconnected IoT object 2 may negotiate a connection (at S30) with the UE 16. In addition, the UE 16 may set up a connection (at S32) with the IoT server 12 in accordance with the configuration information. Once the connections between the UE 16 and the disconnected IoT object 2 and between the UE 16 and the IoT server 12 have been set up, the UE 16 may bridge the two connections (at S34). Thereafter, the IoT object 2 can send and receive packets to and from the IoT server 12, and negotiate predetermined authentication processes in order to re-establish its link (at S36) to the IoT server 12.

Figure 4:
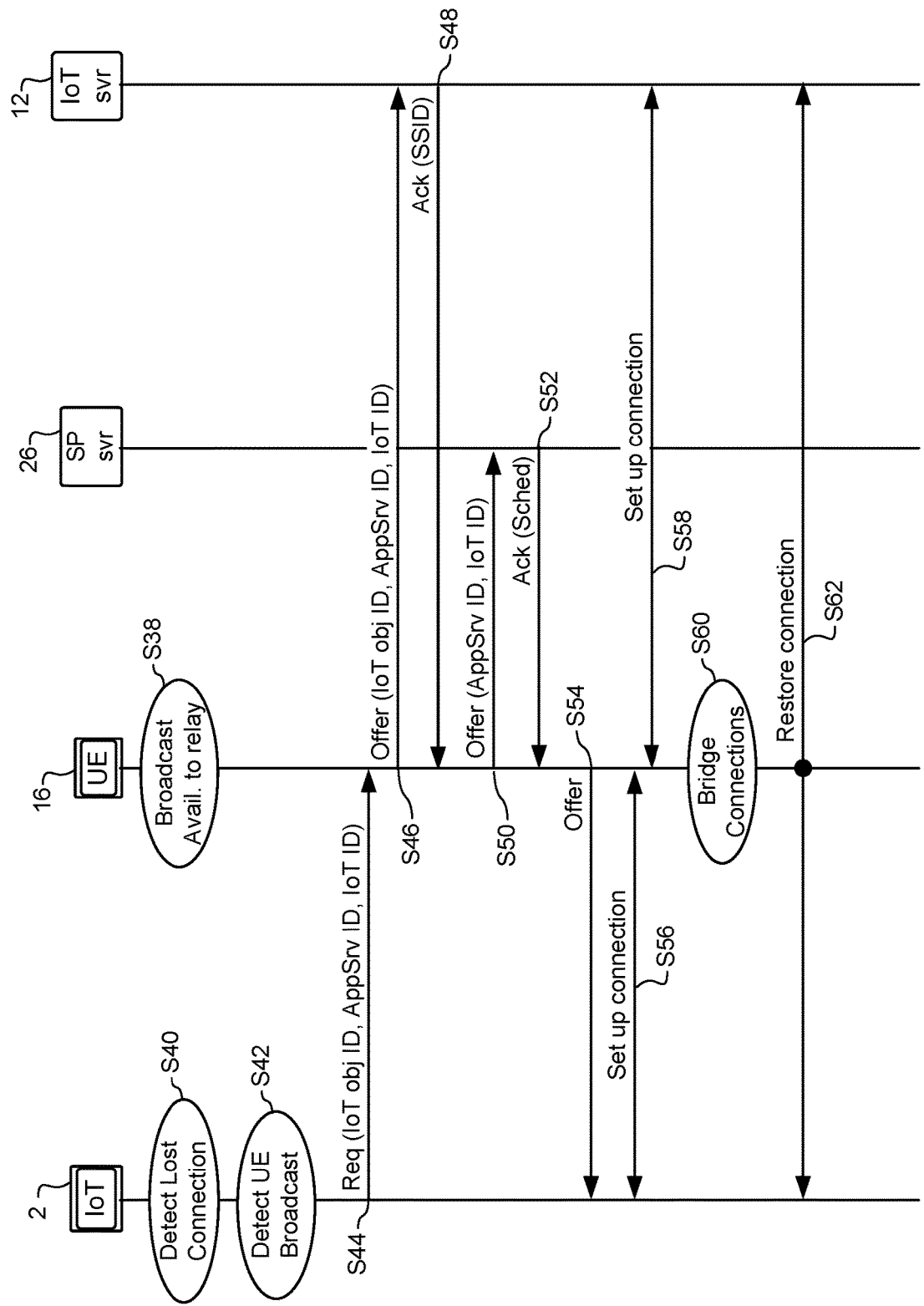
FIG. 4 is a message flow diagram showing principal messages exchanged during a second example process in accordance with the generic process of FIG. 2.

In the example of embodiment of FIG. 3, the IoT object 2 detects the loss of connection, and begins broadcasting a distress signal or beacon. If a UE 16 detects the distress signal or beacon, it may send a response signal, which triggers the IoT object 2 to request a relay connection. As will be appreciated, this arrangement depends on a UE 16 detecting the distress signal or beacon, which means that it must already be monitoring the channel (i.e. the RAT and frequency) used by the IoT object 2. In this case, the UE 16 is at least implicitly willing to relay signals for IoT objects 2. FIG. 4 is a signal flow diagram schematically illustrating an alternative embodiment, in which the UE's willingness to relay signals for IoT objects is made explicit.

Referring to FIG. 4, the UE 16 broadcasts (at S38) a beacon using the RAT of the local network 8. The beacon may be broadcasted at predetermined intervals, and may be formatted as desired, including, for example, a simple "ping". Alternatively, the beacon may have a predetermined format that is recognised by IoT objects 2 within the local network 8. For example, the beacon may include configuration information (such as, for example, any one or more of an ID, a certificate, a MAC address and an SSID) to be used for relay connections.

When the IoT object detects (at S40) the loss of connection, it uses the information (if any) contained in previously received beacon signals (S 42) to send (at S44) a relay request message to the UE 16, in order to request a relay connection to the IoT server 12. For example, the relay request message may include an identifier of the IoT object 2, an address of the IoT server 12, and an identifier of the IoT network or service within which the IoT object operates. Based on the information contained in the relay request message, the UE 16 may send (at S46) an offer message to the IoT server 12, in order to offer to relay a connection for the disconnected IoT object 2. If the IoT server 12 accepts the offer, it may reply (at S48) with an acknowledgement message including configuration information needed by the relay UE 16 to set up connections for relaying packets. The UE 16 may also send (at S50) an offer message to the SP server 26, indicating that it is able to relay packets for the IoT object 2 and IoT server 12. In response to the offer message, the SP server 26 may respond (at S52) with an acknowledgment message including administrative information such as, for example, scheduling information needed by the UE 16 so that it can send relayed data packets to the IoT server 12 using a network slice selected by the SP server 26.

The UE 16 may then send (at S54) an offer to relay data packets to the disconnected IoT object 2. In response to the offer to relay data packets, the disconnected IoT object 2 may negotiate (at S56) a connection with the UE 16. In addition, the UE 16 may set up (at S58) a connection with the IoT server 12 in accordance with the configuration information. Once the connections between the UE 16 and the disconnected IoT object 2 and between the UE 16 and the IoT server 12 have been set up, the UE 16 may bridge the two connections (at S60). Thereafter, the IoT object 2 can send and receive packets to and from the IoT server 12, and negotiate predetermined authentication processes in order to re-establish its link to the IoT server 12.

Figure 5:
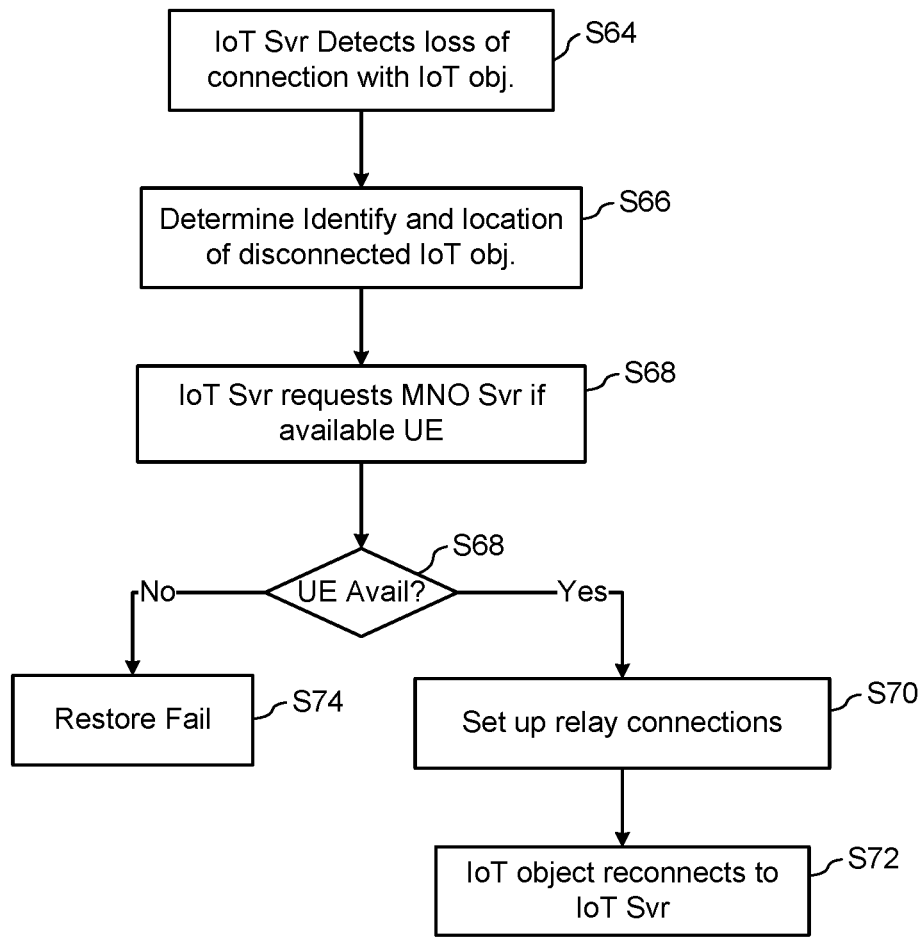
FIG. 5 is a flow chart showing principal steps in a second generic process in accordance with the present disclosure.
Figure 6:
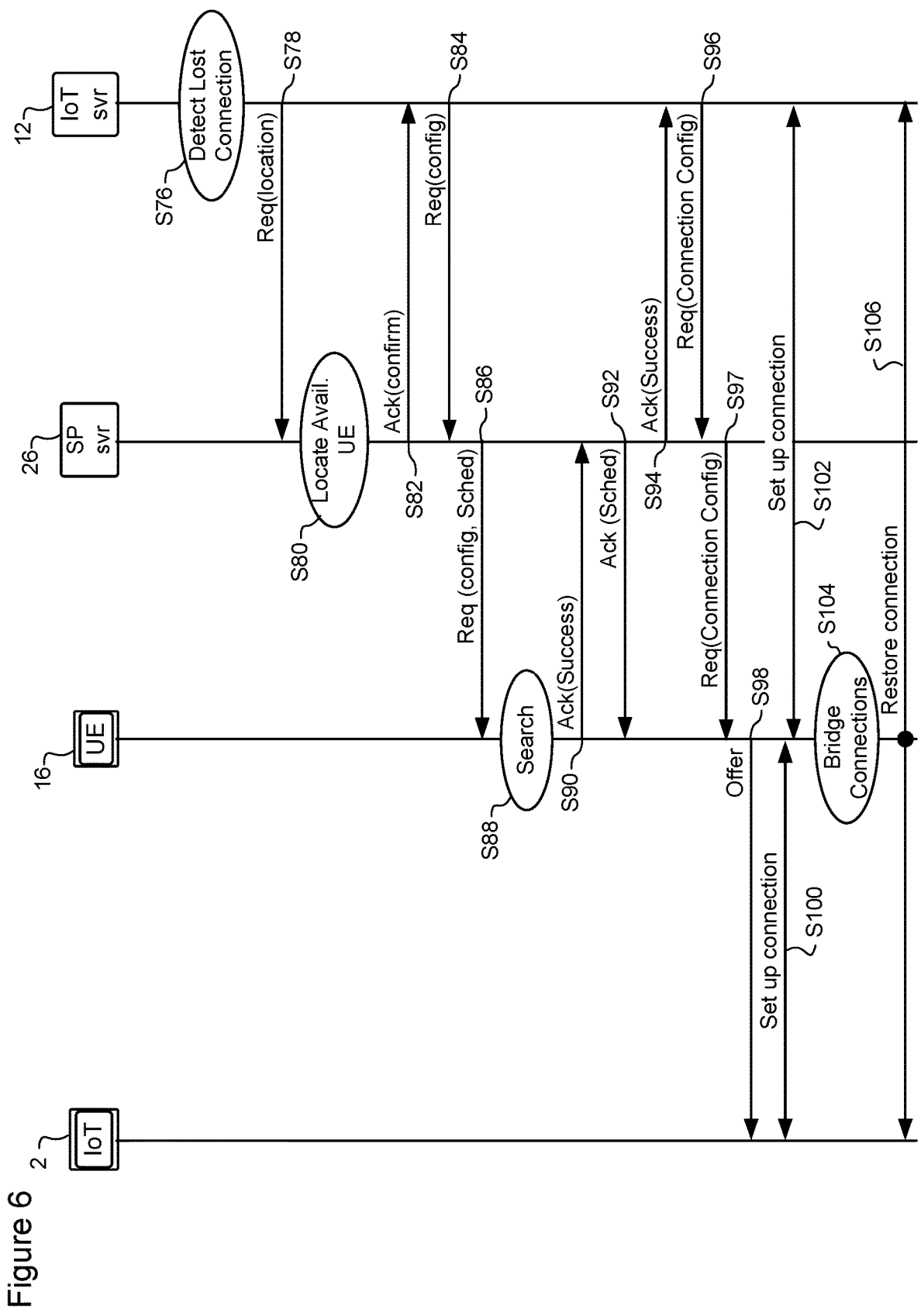
FIG. 6 is a message flow diagram showing principal messages exchanged during a first example process in accordance with the generic process of FIG. 5.
Figure 7:
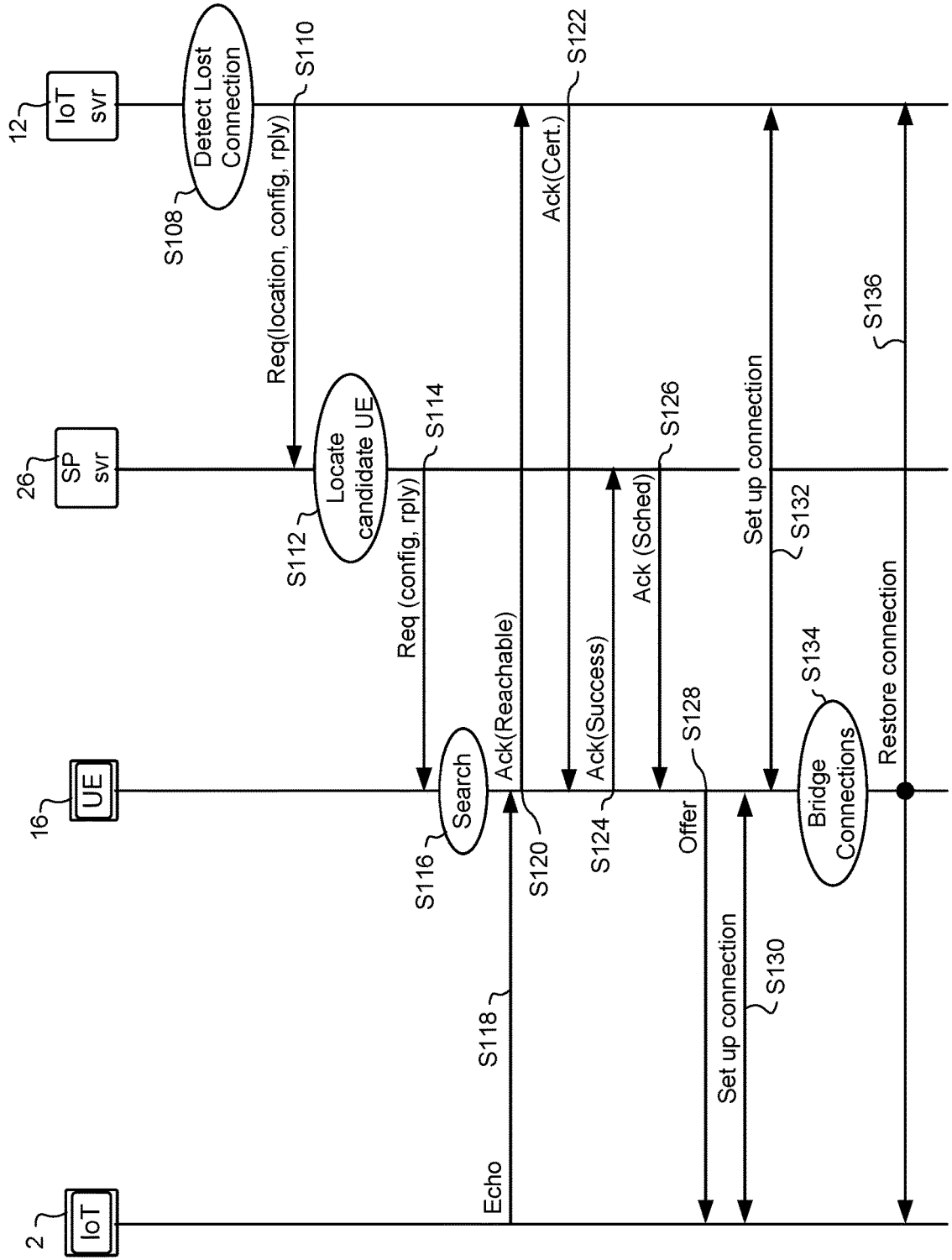
FIG. 7 is a message flow diagram showing principal messages exchanged during a second example process in accordance with the generic process of FIG. 6.

In the example embodiments of FIGS. 3 and 4, the loss of connection is detected by the IoT object 2, which also initiates the reconnection process by sending a request message to the relay UE 16. A disadvantage of this arrangement is that it requires the IoT object 2 to provide the relay UE 16 with sufficient information to enable the relay UE 16 to contact the IoT server 12 and offer to relay packets. In some cases, this arrangement may be unsatisfactory. FIGS. 5-7 illustrate alternative embodiments in which the loss of connection is detected by the IoT server 12, which therefore initiates (and can control) the connection restoration process.

FIG. 5 is a flowchart showing a representative process for restoring connectivity to a disconnected IoT object 2. As may be seen in FIG. 5, in a first step (at S64) the loss of connectivity to the IoT server 12 is detected. In some embodiments, the loss of connectivity may be detected by the IoT server 12 itself, although this is not essential. An alternative arrangement the loss of connectivity may be detected by one or more management or security servers associated with the IoT server 12. Various techniques may be used to detect the loss of connection. For example, each IoT object 2 may be configured to send a predetermined signal to the IoT server 12 at preset intervals. Failure of the IoT server 12 to detect the predetermined signal within a time-out period may thus be used to detect a loss of connection.

In response to the detected loss of continuity, the identity and location of the disconnected IoT object 2 are determined (at S66). For example, in an embodiment in which IoT objects send predetermined signals to the IoT server 12 at preset intervals, the content of these signals may be used to identify the disconnected IoT object 2. For example, where the predetermined signal sent by a given IoT object contains an identifier of the sending IoT object 2, the information contained in previously received signals may be used to identify an IoT object 2 whose signals have not been received within the predetermined time-out period. Once the identity of the disconnected IoT object 2 has been determined, its location may be found by looking up a registry record for the IoT object 2. Any suitable means may be used to define the location of the IoT object 2. For example, a known geographical location of a building in which the IoT object 2 (or the local network 8, or the hub 6) is deployed may be used. Alternatively, the addresses of one or more RAN APs 18 reachable by a UE 16 located within the geographical coverage area of the local network 8 may be used as a proxy for the location of the IoT object 2. Other means of defining the location of the IoT object 2 may be used as desired, without departing from the intended scope of this disclosure. It is contemplated that information of the location(s) of IoT objects 2 within a given local network 8 will be recorded in a registry maintained by the IoT server 12 (or a management or security server associated with the IoT server 12). In some cases the location information may be recorded at a time of deployment of the local network 8. In a further alternative, during normal operation the IoT object may detect SSIDs of other local networks 8 and may report this information to the IoT server 12, which may subsequently use the information to locate the IoT object using a registry of known SSID location. In other cases, the location information may be recorded as part of a process of registering for delivery of an IoT service associated with the IoT server 12.

Once the location of the disconnected IoT object 2 has been determined, the IoT server 12 may send (at S68) a request message containing the location information to the SP server 26. In response to the request message, the SP server 26 may use the location information to identify a UE 16 that is capable of relaying signaling between the disconnected IoT object 2 and the IoT server 12. If a suitable relay UE is found, the SP server may send a request to the relay UE 16 to set up connections (S70) to relay signals and thereby enable the disconnected IoT object 2 to reconnect (S72) with the IoT server 12. On the other hand, if a suitable relay UE 16 cannot be found, then the SP server may send a failure message (S74) to the IoT server. FIGS. 6 and 7 are signal flow diagrams illustrating respective example processes in accordance with the general flow-chart of FIG. 5.

In the example embodiment of FIG. 6, as a first step (S76), the IoT server 12 (or a server associated with the IoT server) detects the loss of connection, and identifies the location of the disconnected IoT object 2 as described above. The IoT server 12 may then send a request message (S78) including location information of the disconnected IoT object 2 to the SP server 26. Based on the location information, the SP server 26 can search its records (S80) to identify one or more candidate UEs that appear to be capable of reaching the disconnected IoT object. If the SP server successfully identifies at least one candidate UE, it may send an offer to relay (S82) to the IoT server 12. In response to the offer to relay, the IoT server 12 may send a request for relay message (S84) to the SP server. The request for relay message may include configuration information for connection to the disconnected IoT object 2. This configuration information may include any one or more of: RAT, frequency, IP address, encryption, SSID, broadcast message, and a security key for authentication. Based on the request for relay message, the SP server 26 can then send a request (S86) containing the connection configuration information to each of the candidate UEs.

If desired, the SP server 26 can simply send a request to all of the identified candidate UEs, and then wait for replies received within a predetermined time-out period. Alternatively, the SP server 26 may select one UE (according to any desired criteria) and then send a request to that selected UE. The request message sent to each candidate UE may include the information defining connection configurations for communicating with the disconnected IoT object 2, and address information for replying to the request. If the UE 16 either responds with a connection fail message or does not respond within a predetermined time-out period, then the SP server 26 may select another candidate UE and send a request message to it. This process may continue until either the SP server 26 receives a success message back from a candidate UE, or else none of the candidate UEs are able to reach the disconnected IoT object.

Upon receipt of a request message from the SP server 26, a candidate UE may use the connection configuration information to search for the disconnected IoT object 2 (S88). In some embodiments, this search may include monitoring the RAT and frequency of the disconnected IoT object 2 for a signal or beacon from the disconnected IoT object 2. Alternatively, the search may include broadcasting a beacon using the RAT and frequency of the disconnected IoT object 2, and monitoring the RAT and frequency of the disconnected IoT object 2 for an echo or reply signal from the disconnected IoT object 2.

If the candidate UE finds the disconnected IoT object (for example by receiving an echo or reply signal from the disconnected IoT object), then the UE 16 may send a "success" message (S90) to the SP server 26, indicating that it has found the disconnected IoT object 2. If desired, the success message may include one or more metrics indicative of an expected quality of a connection between the candidate UE 16 and the disconnected IoT object 2.

If the SP server 26 receives a success message from more than one candidate UE, it may select the relay UE based, for example, on the metrics indicative of an expected quality of a connection between the candidate UE and the disconnected IoT object. In response to the "success" message, or upon selection of the relay UE, the SP server 26 may send a reply message (S92) including administrative information such as, for example, scheduling information needed by the relay UE 16 so that it can send relayed data packets to the IoT server 12 using a network slice selected by the SP server 26.

The SP server 26 may then use the address information provided by the IoT server 12 to send an acknowledgment message to the IoT server 12 indicating that the relay UE 16 has successfully found the disconnected IoT object 2. In response to the acknowledgment message, the IoT server 12 may send a request for relay (S96) to the SP Server 26. The request for relay may include further configuration and/or security information for setting up a connection with the IoT object 2. This configuration information may include any one or more of: RAT, frequency, IP address, encryption, SSID, broadcast message, and a security key for authentication. The SP server 26 may pass (At S97) the request message to the relay UE 16. In some cases, the SP server 26 may pass an unaltered version of the request message to the relay UE 16. In other cases, the SP server 26 may add further configuration parameters to the request message, for example to enable tracking of relayed traffic flows or billing.

The UE 16 may then send an offer (S98) to relay data packets to the disconnected IoT object 2. In response to the offer to relay data packets, the disconnected IoT object 2 may negotiate (S100) a connection with the UE. In addition, the UE 16 may set up a connection (S102) with the IoT server 12. Once the connections between the UE 16 and the disconnected IoT object 2 and between the UE 16 and the IoT server 12 have been set up, the UE 16 may bridge the two connections (at S104). Thereafter, the IoT object can send and receive packets to and from the IoT server, and negotiate predetermined authentication processes in order to re-establish its link to the IoT server.

In the example embodiment of FIG. 7, as a first step (S108), the IoT server 12 (or a server associated with the IoT server) detects the loss of connection, and identifies the location of the disconnected IoT object 2 as described above. The IoT server 12 may then send a request message including location information of the disconnected IoT object 2 to the SP server 26. In addition to the location of the disconnected IoT object 2, the request message may contain information defining connection configurations for communicating with the disconnected IoT object 2, and address information for replying to the request. The configuration information may include any one or more of: RAT, frequency, IP address, encryption, SSID, broadcast message, security key/certificate for authentication.

Based on the location information, the SP server 26 can search its records (at S112) to identify one or more candidate EUs that appear to be capable of reaching the disconnected IoT object 2. If the SP server 26 successfully identifies at least one candidate UE, it can then send a request (S114) containing the configuration information and address information for replying to the request to each of the candidate UEs.

If desired, the SP server 26 can simply send a request to all of the identified candidate UEs. Alternatively, the SP server 26 may select one candidate UE (according to any desired criteria) as the relay UE and then send the request to that selected UE.

Upon receipt of the request message from the SP server 26, the candidate UE may use the connection configuration information to search (S116) for the disconnected IoT object 2. In some embodiments, this search may include monitoring the RAT and frequency of the disconnected IoT object for a signal or beacon from the disconnected IoT object 2. Alternatively, the search may include broadcasting a beacon using the RAT and frequency of the disconnected IoT object 2, and monitoring the RAT and frequency of the disconnected IoT object 2 for an echo or reply signal from the disconnected IoT object 2.

If the candidate UE finds the disconnected IoT object 2 (for example by receiving an echo or reply signal (S118) from the disconnected IoT object), then the UE 16 may send an acknowledgment of reachability message (S120) to the IoT server 12, indicating that it has found the disconnected IoT object 2. If desired, the acknowledgment of reachability message may include one or more metrics indicative of an expected quality of a connection between the candidate UE 16 and the disconnected IoT object 2. In response to the acknowledgment of reachability message from the candidate UE 16, the IoT server 12 may send an acknowledgment message (S122) to the candidate UE 16, which may include further configuration and/or security information for setting up a connection with the IoT object 2.

If desired, the UE may also send a success message (S124) to the SP server 26. In response to the success message, the SP server 26 may send a reply message (S126) including administrative information such as, for example, scheduling information needed by the UE 16 so that it can send relayed data packets to the IoT server 12 using a network slice designated by the SP server 26.

The UE may then send (S128) an offer to relay data packets to the disconnected IoT object. In response to the offer to relay data packets, the disconnected IoT object 2 may negotiate a connection (S130) with the UE 16. In addition, the UE 16 may set up a connection (S132) with the IoT server 12. Once the connections between the UE 16 and the disconnected IoT object 2 and between the UE 16 and the IoT server 12 have been set up, the UE 16 may bridge the two connections (at S134). Thereafter, the IoT object 2 can send and receive packets to and from the IoT server 12, and negotiate predetermined authentication processes in order to re-establish its link to the IoT server 12 (at S136).

In the example embodiments described above, only principle steps in the illustrated processes are illustrated and described for the sake of clarity. It will be appreciated that additional messaging may be added to these examples, as desired. For example, additional messages between the IoT server 12 and the SP server 26 may be used to negotiate parameters of the relay session such as, for example: allocation of costs; duration of the relay session, number of IoT objects to be relayed, etc. In addition, it is possible to abort the reconnection process at any desired point (such as, for example, if the disconnected IoT object 2 fails to connect to the relay UE 16), and it is contemplated that such operations will be associated with additional messaging. As such, the example embodiments described above are not limited to the specific message flows illustrated in FIGS. 3-7.

In the example embodiments described above, the relay UE 16 sends an offer to relay data packets to the disconnected IoT object 2. In response to the offer to relay data packets, the disconnected IoT object 2 may negotiate a connection with the relay UE 16. It will be appreciated that alternative methods may be used to set up the connection between the disconnected IoT object 2 and the relay UE 16. For example, the relay UE 16 may use the configuration information provided by the IoT server 12 to emulate the hub 6. In this case, the disconnected IoT object 2 would be able to "find" the relay UE 16 and connect to it using the disconnected IoT object's normal initialization firmware.

In the example embodiments described above with reference to FIGS. 3 and 4, the disconnected IoT object 2 initiates the re-connection process by broadcasting a beacon or distress signal. In the example embodiments described above with reference to FIGS. 5-7, the IoT server 12 initiates the re-connection process by sending a request message to the SP server 26. If desired, these methods can be combined to produce a double-ended reconnection process, in which the disconnected IoT object 2 broadcasts a beacon or distress signal while the IoT server 12 sends a request message to the SP server 26. This arrangement can be beneficial in that any UEs that receive the beacon or distress signal are automatically candidate UEs, and can identify themselves as such to the SP server 12, for example via the offer message (FIG. 4). Based on this self-identification, the SP server 26 can easily identify the candidate UEs (FIG. 6) and select one candidate UE as the relay UE.

In the example embodiments described above, connectivity between a disconnected IoT object and the data network 10 is restored by setting up a relay path through a relay UE 16 which is connected to a mobile radio access network 14 which comprises radio Access Points (AP) 18 that are connected to a Gateway (GW) 20 through a wired network 22. Each AP 18 includes radio transceiver equipment for maintaining wireless connections 24 with the UEs 16, and signal routing equipment for forwarding signals through the wired network 22 to the GW 20. The GW 20 provides a link between the RAN 14 and the data network 10, and so enables traffic flows between the data network 10 and UEs 16. Communications between UEs 16 and the data network 10 may be subject to policies implemented by a Service Provider (SP) server 26. However, it will be appreciated that use of a Mobile Access Network to carry the relay connections is not essential. For example, the methods described herein can equally be implemented in cases where an access point 18 is connected to the data network 10 via a network operator or service provider server that effectively combines the functions of the SP server 26 and the gateway 20. For example, an access point 18 may be provided as a WiFi-enabled modem of the type commonly used to implement a wireless local area network in a private residence or small business. In this case, the relay UE 16 may be provided as a mobile device (such as a mobile phone) having a data connection with the access point 18, and is capable of reaching the disconnected IoT device. In some cases, the access point 18 itself may also be able to operate as the relay UE, if it is able to reach the disconnected IoT device without recourse to another device within its coverage area.

FIGS. 2-7 and the accompanying description illustrate example methods for restoring connectivity of a disconnected IoT object having a single uplink RAT. It will be appreciated that these methods may be implemented by means of suitable software instructions configured to execute in respective central processing units of the IoT server 12, SP server 26 and UE 16, as appropriate. Software instructions for this purpose may be stored on a non-transitory computer readable medium, such as a memory device. If desired, the software instructions may be stored locally, or may be stored at a central location and downloaded to a device when needed. For example, software instructions for controlling the IoT server 12 and the SP server 26 may conveniently be stored at the IoT server 12 and the SP server 26, respectively. On the other hand, software instructions for controlling the UE 16 may be stored at a central location (for example at either the IoT server 12 or the SP server 26) and downloaded to the UE 16 when needed. For example, in the embodiment of FIG. 6, the software needed to control the UE 16 may be downloaded to the UE 16 by the SP server 26 as part of with the request message at S86.

The embodiments of the invention described above are intended to be representative only. The scope of the invention is therefore intended to be limited solely by the scope of the appended claims.

I claim:

1. A method for managing an Internet of Things object having a single active Radio Access Technology for communication with a data network via a hub of a local network, the method comprising:
   receiving, by a Service Provider server connected to the data network, a request message comprising location information indicating a location of the Internet of Things object that lost connectivity with the data network via the hub;
   identifying, by the Service Provider server, a relay user equipment based on the location information;
   sending, by the Service Provider server, a request to the relay user equipment to establish a relay connection between the Internet of Things object and the data network, for restoring connectivity between the Internet of Things object and the data network;
   receiving, by the Service Provider server, a success message from the relay user equipment indicating that the relay user equipment has found the disconnected Internet of Things object;
   sending, by the Service Provider server, a reply message to the relay user equipment, the reply message include comprising scheduling information for the relay user equipment; and
   sending, by the Service Provider server to the relay user equipment, at least one of further configuration information and security information for establishing the relay connection.

2. The method as claimed in claim 1, wherein the configuration information includes one or more of: the Radio Access Technology for the communication, the frequency for the communication, an IP address of Internet of Things object, encryption, a service set identifier (SSID), a broadcast message, and a security key for authentication of the relay connection.

3. The method as claimed in claim 2, wherein the request message further includes at least one of the configuration information and address information for an Internet of Things server.

4. The method as claimed in claim 1, further comprising:
sending, by the Service Provider server, an offer message to the Internet of Things server;
receiving, by the Service Provider server, a request for relay message from the Internet of Things server, the request for relay message comprising the configuration information.

5. The method as claimed in claim 1, wherein identifying the relay user equipment comprises:
identifying at least one candidate user equipment based on the location information; and
selecting the relay user equipment from among the at least one candidate user equipment.

6. The method as claimed in claim 1, wherein the location information comprises any one or more of:
a known geographical location of either the Internet of Things object or the hub;
an address of at least one radio access point having a known coverage area that overlaps a local network including the Internet of Things object.

7. The method as claimed in claim 5, wherein selecting the relay user equipment from among the at least one candidate user equipment comprises:
sending a request message to each candidate user equipment, the request message comprising the connection configuration information;
receiving a reply message from at least one candidate user equipment; and
selecting the relay user equipment based on received reply messages.

8. The method as claimed in claim 1, further comprising:
after receiving the request message, sending, by the Service Provider server, an offer message to the Internet of Things server;
receiving, by the Service Provider server, the configuration information from the Internet of Things server; and
including, by the Service Provider server, the connection configuration information in the request sent to the relay user equipment.

9. A Service Provider server connected to a data network via a hub, the Service Provider server configured to:
receive a request message comprising location information indicating a location of an Internet of Things object that lost connectivity with the data network via the hub;
identify, by the Service Provider server, a relay user equipment based on the location information;
send a request to the relay user equipment to establish a relay connection between the Internet of Things object and the data network, for restoring connectivity between the Internet of Things object and the data network, the request including configuration information for establishing the relay connection;
receive a success message from the relay user equipment indicating that the relay user equipment has found the disconnected Internet of Things object;
send a reply message to the UE, the reply message include comprising scheduling information for the relay user equipment; and
send at least one of further configuration information and security information for establishing the relay connection.

10. The Service Provider server as claimed in claim 8, wherein identifying the relay user equipment comprises:
identifying at least one candidate user equipment based on the location information; and
selecting the relay user equipment from among the at least one candidate user equipment.

11. The Service Provider server as claimed in claim 10, wherein selecting the relay user equipment from among the at least one candidate user equipment comprises:
sending a request message to each candidate user equipment, the request message comprising the connection configuration information;
receiving a reply message from at least one candidate user equipment; and
selecting the relay user equipment based on received reply messages.

12. The Service Provider server as claimed in claim 9, wherein the Service Provider server further configured to:
after receiving the request message, sending, by the Service Provider server, an offer message to the Internet of Things server;
receiving, by the Service Provider server, the configuration information from the Internet of Things server; and
including, by the Service Provider server, the connection configuration information in the request sent to the relay user equipment.

13. The Service Provider server as claimed in claim 9, wherein the configuration information includes one or more of: the Radio Access Technology for the communication, the frequency for the communication, an IP address of Internet of Things object, encryption, a service set identifier (SSID), a broadcast message, and a security key for authentication of the relay connection.

14. A method comprising:
receiving, by a user equipment, a relay request message sent by an Internet of Things object having a single active Radio Access Technology for communication with an Internet of Things server via a hub of a local network within which the Internet of Things object operates and a data network;
receiving, by a service provider server connected to the data network, the relay request message comprising location information indicating a location of the Internet of Things object that lost connectivity with the data network via the hub;
identifying, by the Service Provider server, the user equipment based on the location information;
sending, by the service provider server, a request to the user equipment to establish a relay connection between the Internet of Things object and the data network, for restoring connectivity between the Internet of Things object and the data network;
receiving, by the Service Provider server, a success message from the user equipment indicating that the user equipment has found the disconnected Internet of Things object;
sending, by the Service Provider server, a reply message to the user equipment, the reply message include comprising scheduling information for the user equipment;
sending, by the Service Provider server to the user equipment, at least one of further configuration information and security information for establishing the relay connection;

sending, by the user equipment, an offer message to the Internet of Things Object establish the relay connection between the Internet of Things Object and the Internet of Things server via the user equipment and the data network;

receiving, by the user equipment from the Internet of Things Object, configuration information for establishing the relay connection; and establishing, by the user equipment, the relay connection.

15. The method as claimed in claim 14, wherein the relay request message comprises at least one of an identifier of the Internet of Things object, an address of the Internet of Things server, and an identifier of the local network within which the Internet of Things object operates.

16. The method as claimed in claim 14, further comprising:

sending, by the user equipment, an offer message to the Service Provider server indicating that the user equipment is able to relay packets between the Internet of Things object and Internet of Things server;

receiving, by the user equipment, acknowledgment message sent by the Service Provider server, the acknowledgment message including scheduling information for sending relayed data packets to the Internet of Things server using a network slice selected by the Service Provider server.

17. The method as claimed in claim 14, further comprising:

detecting, by the user equipment, a beacon or distress signal broadcast by the Internet of Things object which indicates the Internet of Things object lost connectivity with the data network via the hub.

18. The method as claimed in claim 14, further comprising:

broadcasting, by the user equipment a beacon using the Radio Access Technology, the beacon comprising configuration information to be used by the Internet of Things Object for the relay connection.

* * * * *

UNITED STATES PATENT AND TRADEMARK OFFICE
CERTIFICATE OF CORRECTION

PATENT NO. : 10,536,211 B2
APPLICATION NO. : 15/294230
DATED : January 14, 2020
INVENTOR(S) : Philippe Leroux It is certified that error appears in the above-identified patent and that said Letters Patent is hereby corrected as shown below:

In the Specification

In the Description:

Column 10, Line 41:
"candidate UEs that appear to be capable of reaching the"
Should read:
--candidate EUs that appear to be capable of reaching the--

Column 10, Line 43:
"tifies at least one candidate UE, it may send an offer to relay"
Should read:
--tifies at least one candidate EU, it may send an offer to relay--

Column 10, Line 54:
"date UEs."
Should read:
--date EUs.--

Column 12, Line 15:
"at least one candidate UE 16, it can then send a request (S114)"
Should read:
--at least one candidate EU 16, it can then send a request (S114)--

Column 12, Line 18:
"UEs."
Should read:
--EUs.--

Signed and Sealed this
Second Day of June, 2020

Andrei Iancu
*Director of the United States Patent and Trademark Office*

Column 12, Line 22:
"desired criteria) as the relay UE and then send the request to"
Should read:
--desired criteria) as the relay EU and then send the request to--